United States Patent [19]

Semenenko

[11] Patent Number: 4,470,524
[45] Date of Patent: Sep. 11, 1984

[54] APPARATUS FOR CONTROLLING DISCHARGE FROM A SILO

[76] Inventor: Ivan Semenenko, 80 Maidenhall, Highnam, Gloucestershire, England

[21] Appl. No.: 307,198

[22] Filed: Sep. 30, 1981

[30] Foreign Application Priority Data

Oct. 9, 1980 [GB] United Kingdom ................. 8032670
Apr. 24, 1981 [GB] United Kingdom ................. 8112769

[51] Int. Cl.$^3$ ............................................. B65D 88/66
[52] U.S. Cl. ................................... 222/196; 222/504; 91/167 R; 92/39; 92/43; 92/44
[58] Field of Search ............... 222/196, 504, 199, 200; 92/39

[56] References Cited

U.S. PATENT DOCUMENTS 3,854,612 12/1974 Snape ............................. 222/196 X

FOREIGN PATENT DOCUMENTS

| 281685 | 5/1970 | Austria . |
| 1279571 | 10/1968 | Fed. Rep. of Germany . |
| 582110 | 11/1946 | United Kingdom . |
| 1195850 | 6/1970 | United Kingdom . |
| 1415721 | 11/1975 | United Kingdom . |
| 1420344 | 1/1976 | United Kingdom . |
| 1473408 | 5/1977 | United Kingdom . |
| 1537684 | 1/1979 | United Kingdom . |
| 2008809A | 6/1979 | United Kingdom . |

OTHER PUBLICATIONS

*IBM Technical Disclosure Bulletin*, vol. 3, No. 2, Jul. 1960, Poythress, G. W., "Linear, Incremental Positioning Device".

*Primary Examiner*—Joseph J. Rolla
*Assistant Examiner*—Frederick R. Handren
*Attorney, Agent, or Firm*—Shapiro and Shapiro

[57] ABSTRACT

Apparatus for controlling discharge from a silo, comprising a device mounted internally of a discharge opening for flowable material and forming with that opening a flow path for material through the opening. A bellows actuator associated with the device moves the device relative to the discharge opening to close the opening or to open it to a desired extent. A vibrator carried by the device vibrates the device to assist flow of material through the discharge opening when it is open.

4 Claims, 4 Drawing Figures

APPARATUS FOR CONTROLLING DISCHARGE FROM A SILO

TECHNICAL FIELD OF THE INVENTION

The invention relates to apparatus for controlling discharge of flowable material from a store thereof having an opening. Such a store may comprise a silo, or other bulk material container, such bulk material being flowable material such as particulate or powdered material.

BACKGROUND ART

Material such as powder or particulate material is often housed in bulk in a silo or bin, from which it is to be discharged periodically. The silo generally has a tapering, usually conical, outlet. The material is, in proposed apparatus, urged through the outlet by a bin activator which is in the form of a cone mounted in the outlet and which is vibratable in a horizontal direction, that is in a direction generally at right angles to the longitudinal axis of this opening. The cone is vibratable by a vibrator situated externally of the silo. The cone is smaller in diameter than the inside diameter of the outlet so that an outlet annulus is defined between the cone and the outlet and through which the material flows. The purpose is not only to discharge the powder, but to consolidate, deaerate and condition the powder prior to discharge. Because of the deaeration and consolidation, the powder will bridge over the annular outlet, and thus obturate it, when vibration of the cone ceases. The annular outlet thus has to be carefully sized for each material being handled; in other words the prior apparatus can only handle a particular material. The apparatus is thus material condition dependant.

SUMMARY OF THE INVENTION

It is an object of the invention to seek to mitigate these disadvantages of prior apparatus.

According to one aspect of the invention there is provided apparatus for controlling discharge of flowable material from a store thereof having a discharge opening, comprising:

(a) a device adapted to be mounted internally of said opening for flowable material and to form with that opening a flow path for material through said opening; and (b) a vibrator carried internally of the opening in use for vibrating the device in said opening.

According to a second aspect of the invention there is provided apparatus for controlling discharge of flowable material from a store thereof having a discharge opening, comprising:

(a) a device adapted to be mounted internally of said discharge opening for flowable material and to form with that opening a flow path for material through the opening;

(b) a vibrator internally of the opening in use for vibrating the device whereby to assist flow of flowable material through the discharge opening; and (c) means to move the device between a position in which the discharge opening is fully closed against flow of the material and an open position, for providing flow of material through said opening.

Thus using the invention it is possible to provide a device which is relatively simple in construction and which can be vibrated from inside a discharge opening.

The vibrator may be adapted to vibrate the device in a direction which substantially corresponds to the direction of the flow path. This construction provides that in a vertical opening the direction of vibration is substantially vertical.

The device may be movable in position by adjustable means to adjust the size of the flow path. Thus the device can be moved as required to provide a larger or smaller flow path depending on the particular flowable material being handled.

The vibrator may be a pneumatic vibrator such as a bellows means, though others for example an electrical, a mechanical, hydraulic or an electro mechanical vibrator could be used.

It will be understood that the invention extends to a silo, bin or store in the discharge opening of which apparatus as hereinbefore described is mounted.

Apparatus embodying the invention is hereinafter described, by way of example, with reference to the accompanying drawings.

Figure 1:
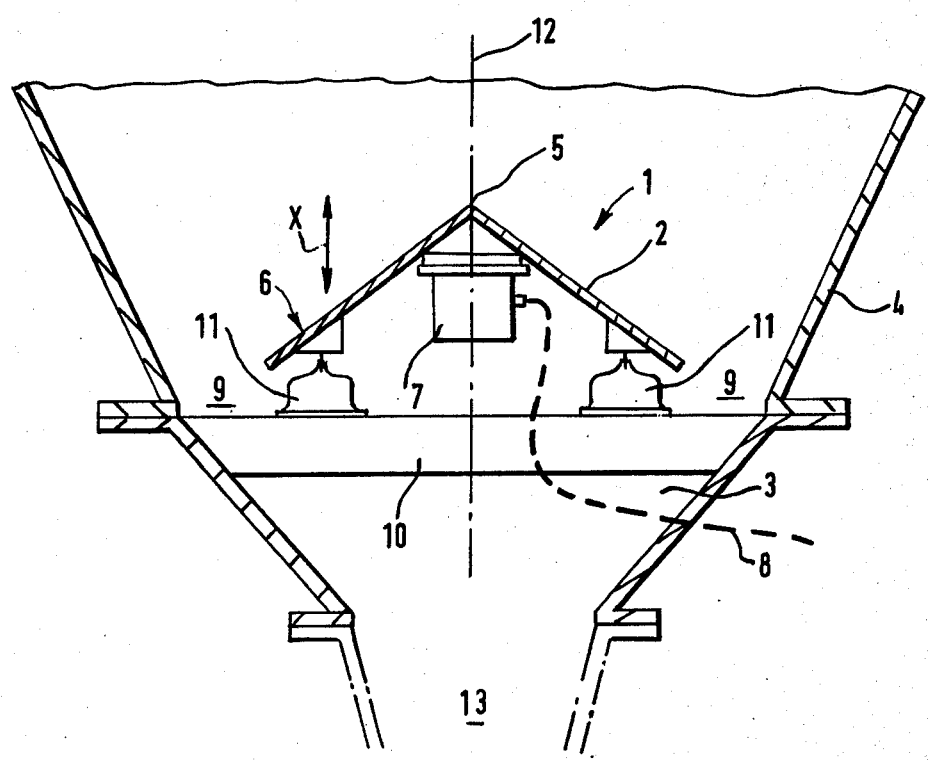
FIG. 1 is a schematic longitudinal sectional view of a first apparatus embodying the invention.

Referring firstly to FIG. 1, the apparatus 1 shown comprises a conical device 2 mounted internally of a discharge opening 3 of a silo 4 for flowable, in this case particulate, material (not shown). The apex 5 of the device 2 is directed upwardly (as viewed) in order to provide a downwardly divergent conical surface 6. There is an air vibrator 7 carried by the device 2. The air supply to the vibrator is via a line 8 which passes to the outside of te silo 4.

The maximum diameter of the free edge of the device 2 is less than the internal diameter of the opening 3 and defines with the inner surface of the opening an annular flow path 9.

The apparatus 1 is mounted in the discharge opening 3 on a cross beam 10. The device 1 is mounted on the cross beam 10 by vibration isolators 11, in the form of rubber or rubberised cups in the embodiment shown.

In use, when it is desired to deaerate, condition and discharge the particulate material, the vibrator 7 is actuated by the air line 8. The vibrator vibrates in the vertical (as viewed) mode that is in a direction which substantially corresponds to the direction of the flow path, in this case substantially vertically as indicated by axial line 12. The device 1 thus vibrates vertically as shown by the double headed arrow "X", and material flows from the silo 4, over the surface 6 round the cone 2 through the flow path 9 and thence to a funnel 13 to take-off equipment (not shown).

The isolators 11 cut out a majority of the vibration to the beam 10, but allow it to vibrate a little so as not to form a "bridge" for material at the beam.

When the vibrator 7 is stopped, the material ceases to flow, because it forms a bridge at the annular opening. It flows again when the vibrator 7 is started once more.

Figure 2:
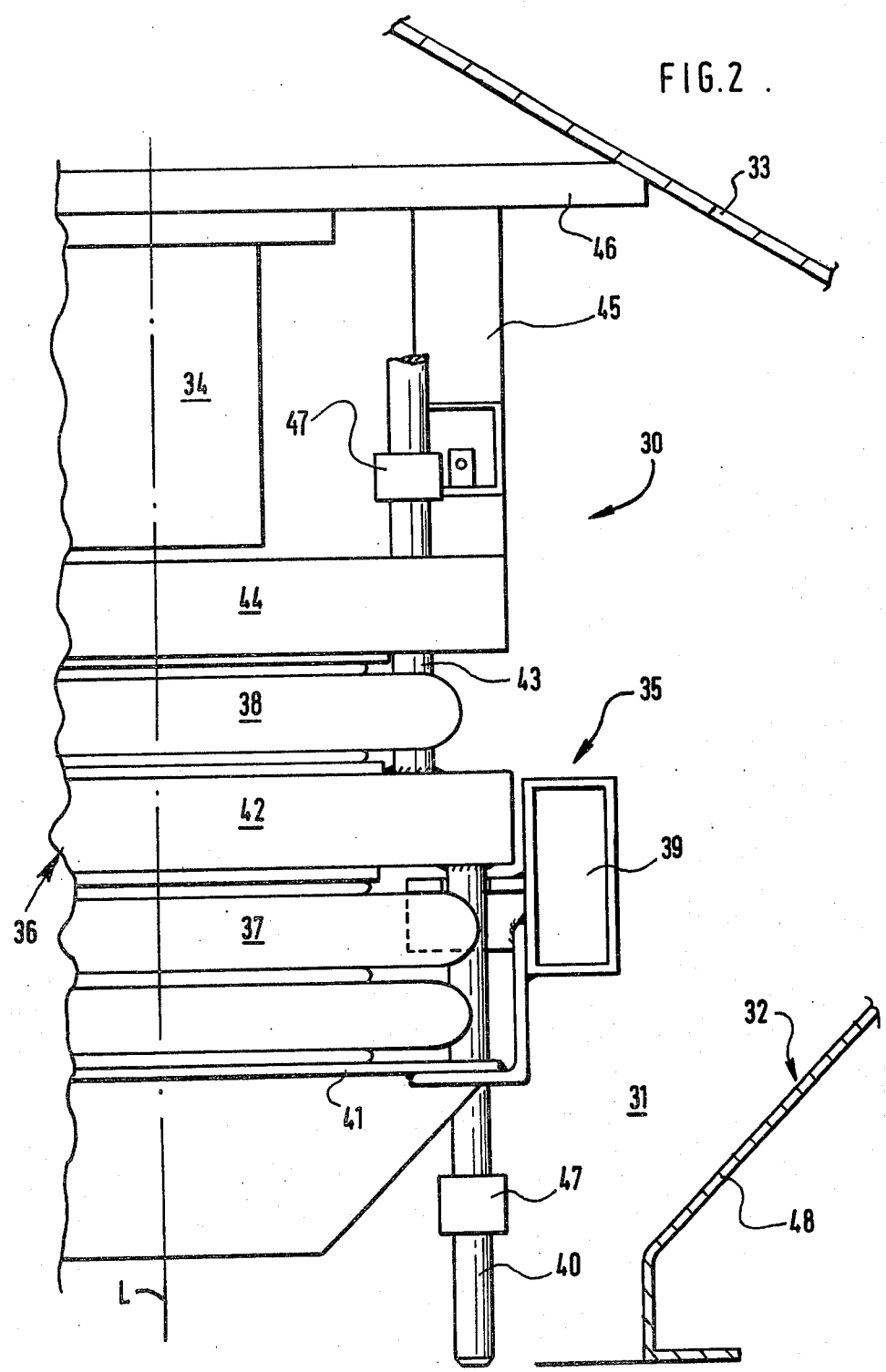
FIG. 2 is a schematic longitudinal sectional view of part of a second apparatus embodying the invention.

Referring now to FIG. 2, there is shown apparatus 30 which is a bin activator and is shown mounted in the discharge opening 31 of a bin or silo 32 for holding flowable material (not shown). The apparatus 30 includes a device in the form a cone 33 forming closure means mounted internally of the opening 31 and carrying a vibrator 34. There is means 35 to move the cone 33 between a position in which discharge opening 31 is fully closed against the flow of material through the opening and a fully open or an intermediate position or positions for providing varying rates of flow of material through the opening.

The means 35 for moving the cone comprises a bellows means 36. The bellows means 36, which is operated by gas, preferably air from a line (not shown) connected to a source (also not shown) is in two parts 37 and 38 which can be operated independently or together.

The first part 37 provides a partial lift, the second part 30 a partial lift, and the two parts 37 and 38 together provide a full lift of the cone 33 to the fully open position.

The whole apparatus 30 is mounted centrally of the discharge opening beneath the closure means 33 and is supported on two transverse beam assemblies 39 of which only one, the right hand one as viewed, is shown. (The left hand half of the apparatus 30 is a mirror image of the right hand half, as considered about centre line 'L' and is not shown, for clarity).

Guide rods 40 pass through the beam assemblies 39.

A base 41 supports the first bellows means part 37. The rods 40 support a cross beam 42 to which further rods 43 are secured as by welding, the further rods 43 guiding a beam 44 to which is mounted via columns 45 a support 46 for the vibrator 34, which support 46 directly connects the vibrator 34 and the inner (under) surface of the cone 46.

The second bellows means 38 is mounted on the beam 42.

There are adjusting locking devices 47 on the guide rods to set the amount of lift of the apparatus 30.

In operation, assuming the opening 31 is closed by the cone 33 resting on the surround wall 48 thereof (not shown) if it is desired to provide a trickle flow through the opening 31 second bellows means part 38 is inflated so that the beam 44 is raised, thereby raising the column 45 and the cone 33, guided by the further guide rods 43, to the required height as set by the locking device 47 on the rods 43. A small annulus is thereby opened between the free edge of the cone 33 and the surround wall 48, through which material flows.

If faster trickle flow is required, the first bellows means part 37, is inflated, the first part providing twice the lift of the part 38. This raises the cone 33, via the cross beam 42 the second bellows means part 38 and the column 45.

If a full flow is required, as by providing an annulus of the largest possible cross-sectional area, both parts 37 and 38 of the bellows means 36 are inflated.

In all positions, the vibrator 34 is actuated to vibrate the cone 33, which activates the material and urges it to flow through the opening 31 without bridging.

The flowable material it will be understood may be particulate cohesive semi-dry or semi-wet and may be required to be handled in continuous and batch process lines.

The apparatus 30 provides a three position lift and therefore metering control of material through the outlet 31. The cone also acts as a valve in that it can shut off the outlet completely against flow therethrough.

Figure 3:
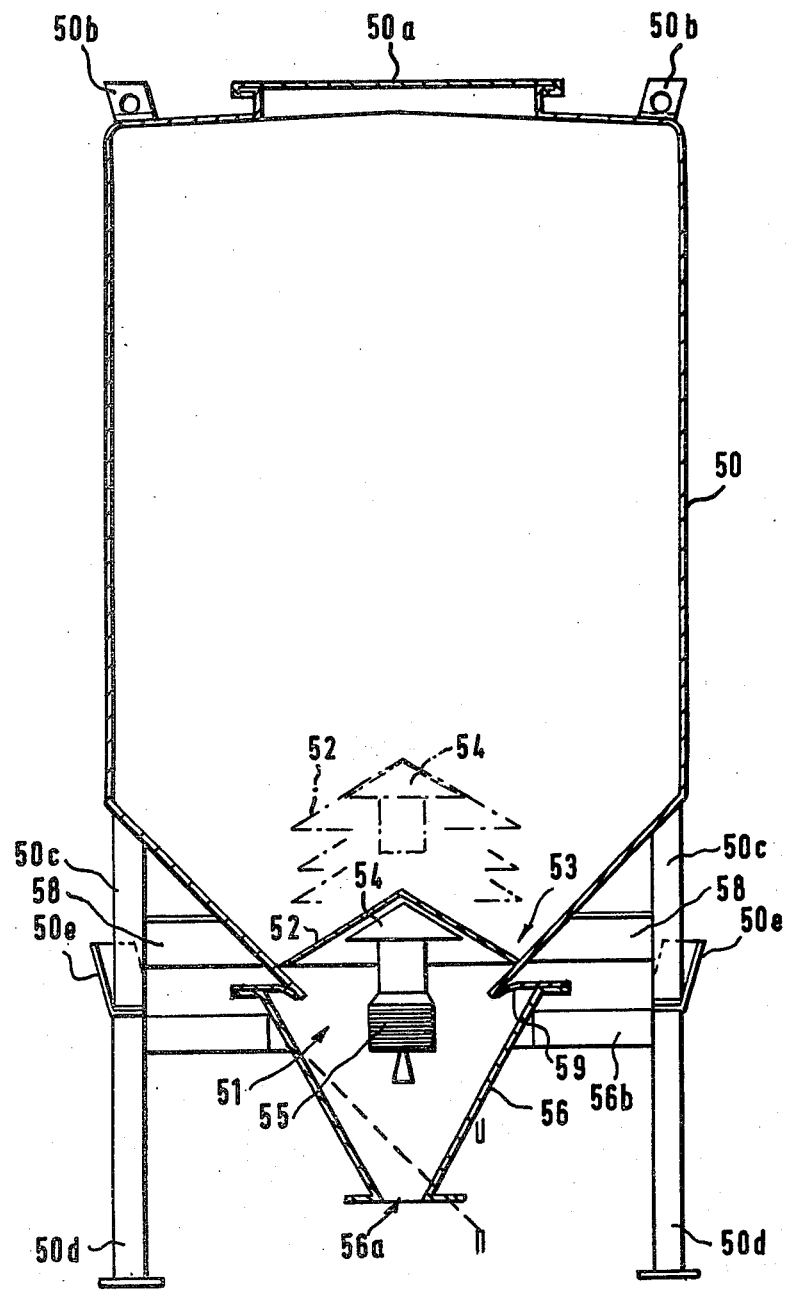
FIG. 3 is a schematic longitudinal sectional view of a third apparatus embodying the invention.

Referring now to FIG. 3, there is shown an intermediate bulk container 50 (I.B.C.) including apparatus 51 embodying the invention for controlling flow of flowable material (not shown) therefrom. The apparatus 51 includes a device in the form of a cone 52 forming closure means which is mounted internally of the opening or outlet 53 of the I.B.C. 50 to form therewith a flow path through the opening 53. The apparatus 51 also includes a separate vibrator 54 which is in use carried internally of the opening 53 by adjustable positioning means in the form of a bellows means 55. The I.B.C. 50 thus has a separate discharge station 56 of tapering cross-section which has a bottom (solid line) or side (dashed line) outlet 56a as desired and which is supported by cross-beams 56b.

The I.B.C. 50 has a sealed weatherproof lid 50a, overhead lift points combined with stacking location feet 50b, and support legs 50d at the discharge station 56, the legs 50d having guides 50e for the lower ends (as viewed) of the I.B.C. legs 50c and also providing anchorages for the cross-beams 56b.

In use, the I.B.C. 50 is moved from a position where it is filled with flowable material by a fork-lift truck (not shown) the forks of which enter channels 58 provided on the I.B.C. The I.B.C. 50 is deposited with its legs 50c on the legs 50d at the discharge station 56, the cone 52 and vibrator 54 being in the full line position shown. In order to allow particulate material to flow out of the I.B.C. 50 the bellows means 55 is inflated to raise the vibrator 54 to engage the undersurface (as viewed) of the cone 52, which is thereby raised, so opening the flow path 53 between the free edge of the cone 52 and the innersurface of the outlet of the I.B.C. The vibrator 54 is vibrated and this vibration vibrates the material and urges it to flow without bridging through the discharge opening 53. The cone 52 has a plurality of raised positions, as shown in dashed lines, to provide a range of flow rates from the I.B.C. 50. The upper limit of raising of the cone 52 is set by guides (not shown) which guide and limit the upper movement of the vibrator and bellows means. When the I.B.C. 50 is empty or the required amount of material has flowed therefrom, the bellows means 55 is deflated so that it returns, with the vibrator 54, to the full line position shown. The cone 52 also returns to the full-line position shown in which the opening 53 from the I.B.C. 50 is fully closed, or fully valved, as shown. The I.B.C. 50 is then removed from the discharge station by a fork-lift truck.

In all the operative positions shown by dashed lines, the vibrator 54 engages the cone 52 and can lift it as well as vibrate it.

It will be understood that although an I.B.C. with a separate discharge system has been shown, the apparatus 51 can be incorporated in the opening of an integral I.B.C. self discharge bin, in an intermediate hopper assembly, as well as in silo arrangements which are in effect fixed hoppers or containers. Also, in FIG. 3, there is a full seal 59 between the I.B.C and the discharge station when the I.B.C is placed in position. The seal 59 may be a flexible flange of annular form into which the I.B.C outlet opening is placed.

Figure 4:
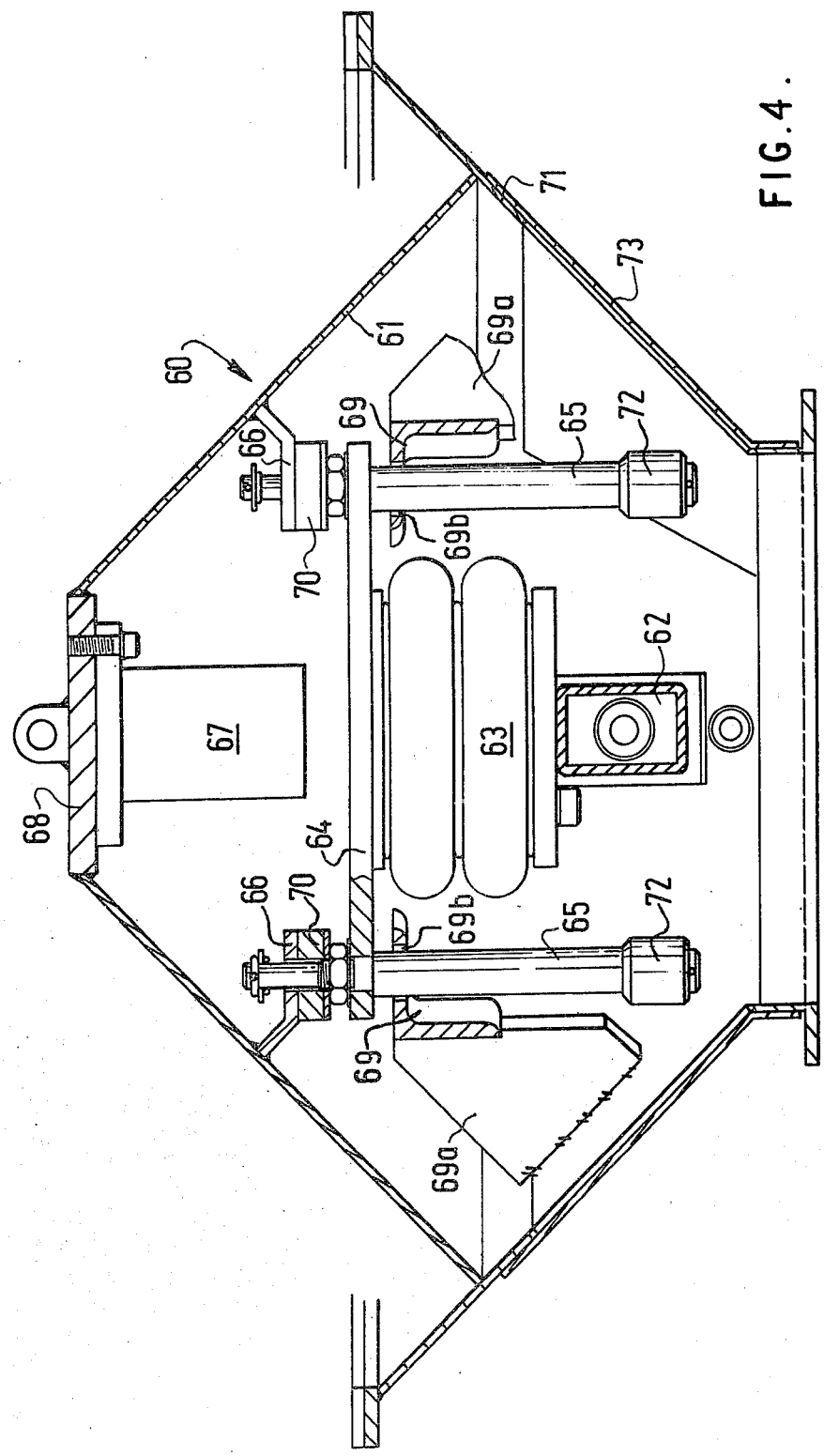
FIG. 4 shows a longitudinal sectional view of a fourth embodiment of apparatus embodying the invention.

Referring now to FIG. 4, the apparatus 60 shown includes a device similar to that of FIG. 2. The device includes a cone 61 forming closure means and is secured to the outlet from a bin or silo and is effectively mounted on a bulkhead 62 which extends across the outlet. The bulkhead supports a bellows 63 which in turn supports a cross-beam 64, and the cross-beam 64 is secured to columns 65 which in turn support, from the underside as viewed, the cone 61, via brackets 66. The cone 61 supports a vibrator 67 secured to a flat top plate 68 of the cone 61.

The columns 65 are guided by passing through holes 69b in angle brackets 69 having parts 69a secured to the inner surfaces of the outlet as by welding.

A cushion or insulator block 70 insulates the cone from the cross-beam 64.

In use to flow material from the outlet of the bin over the cone 61 using apparatus 60, the bellows is inflated to raise the cross-beam 64 and hence columns 65. This raises the cone 61 the desired amount from the wall 71 to leave an annular gap between the free edge of the cone 61 and the wall 71.

Flow of the material above the cone through the outlet is enhanced by vibrating the vibrator 67, so vibrating the cone and the material which thereby flows freely.

The material is deaerated and conditioned by this vibration and also does not form "bridging" which would otherwise block the flow.

The cone can be raised to any desired extent, from the position shown, depending on the length of the columns 65 as determined by end stops 72 which may be adjustable in position along the length of the columns.

The outlet or bin activator has an inspection door 73. In every embodiment using bellows means, the bellows are designed to operate at 80 p.s.i, and to withstand, or lift a pressure of 1-2 tons per sq. ft. Also, apparatus embodying the invention and shown and described herein may be used with any shape of silo, bin or the like such as round, square or rectangular.

I claim:

1. Apparatus for controlling substantially vertical discharge of flowable material from a store having a discharge opening near a lower end thereof, comprising:
   (a) closure means adapted to be mounted internally of said discharge opening for flowable material and to form with that opening a flow path for material through the opening;
   (b) bellows means for mounting said closure means on a support and for moving said closure means substantially vertically relative to the opening between a position in which the opening is fully closed against flow of the material through the opening and a position in which the opening is open for flow of the material therethrough, said bellows means being located centrally of said discharge opening beneath said closure means; and
   (c) a vibrator adjacent to the closure means for vibrating the closure means to assist flow of material through the discharge opening in said position of said closure means in which said opening is open for flow of material therethrough, said bellows means being interposed between said vibrator and said support.

2. Apparatus as defined in claim 1, the vibrator being adapted to vibrate the closure means in a direction which substantially corresponds to the direction of the flow path.

3. Apparatus as defined in claim 1, wherein said bellows means is two part bellows means one of said parts being operative to raise said closure means independently of said other part of said bellows means.

4. Apparatus as defined in claim 1, wherein both the vibrator and the bellows means are pneumatic.

* * * * *